United States Patent [19]

Riedhammer

[11] 3,946,561
[45] Mar. 30, 1976

[54] FLUID PRESSURE CONTROL DEVICES
[75] Inventor: Josef Riedhammer, Ulm, Germany
[73] Assignee: Hydromatik GmbH, Ulm, Germany
[22] Filed: Dec. 23, 1974
[21] Appl. No.: 535,166

[30] Foreign Application Priority Data
Dec. 27, 1973 Germany............................ 2364814

[52] U.S. Cl. .................... 60/445; 60/450; 417/212
[51] Int. Cl.² .......................................... F16H 39/46
[58] Field of Search ....... 60/445, 449, 450; 417/212

[56] References Cited
UNITED STATES PATENTS

| | | | |
|---|---|---|---|
| 3,296,797 | 1/1967 | Tlusty .................................... | 60/450 |
| 3,444,689 | 5/1969 | Budzich ............................ | 60/445 X |

*Primary Examiner*—Edgar W. Geoghegan
*Attorney, Agent, or Firm*—Owen, Wickersham & Erickson

[57] ABSTRACT

A control device for connection between a hydropump and a hydromotor of a hydraulic system, to provide a control pressure for regulating operation of the system, has a valve housing accommodating a displaceable valve member formed to provide a throttling passageway between an inlet and a main outlet of the housing. Fluid flow through the throttle tends to move the valve member to open a connection between the inlet and a control pressure outlet of the housing, against the action of a resilient biasing arrangement and a force produced on the member in dependence upon the control pressure itself. The action of the biasing arrangement, however, is variable, enabling the device to be designed in accordance with a desired fluid-pressure/flow rate relationship.

8 Claims, 2 Drawing Figures

3,946,561

FLUID PRESSURE CONTROL DEVICES

BACKGROUND OF THE INVENTION

The present invention relates to fluid pressure control devices.

A fluid pressure control device can be designed for regulating operation of a hydrostatic transmission system, a hydropump and/or a hydromotor of which system is adjusted by a variable control oil pressure as a function of hydraulic working pressure or rate of delivery of oil in the transmission system.

In such a hydraulic system, it has been proposed to apply the control pressure for adjusting the hydropump and/or the hydromotor of the transmission system, and therewith the power data of the transmission system, either by means of a separate auxiliary pump or by branching off oil from a main oil flow of the transmission system in a predetermined ratio thereto. In such a system a fluid pressure control valve device can effect adjustment, for example for power control of the transmission system, of the control pressure as a function of a predetermined parameter, for example as a function of hydraulic working pressure or oil flow supplied to the hydromotor of the transmission system. Such a control device as hitherto proposed may be unduly costly, since it is either provided with a separate auxiliary pump, for obtaining the control pressure, or else it is very complicated.

Of possible interest also in this respect is German Auslegeschrift No. 1,247,437, in which there is proposed a control valve, employed as a branch valve which, on the one hand, branches off an auxiliary oil stream supplied by an auxiliary oil pump, for replacing leakage oil losses in a transmission system circuit and, on the other hand, supplies a control oil pressure for adjusting a hydropump and/or a hydromotor of a hydraulic transmission system.

The power or working capacity of a hydrostatic transmission system is determined by the product of hydraulic working pressure and main fluid flow in the transmission system. The present invention has accordingly been developed with a view to providing a control device that can be designed to enable power or working capacity of a hydraulic transmission system to be controlled in a relatively simple manner in accordance with a substantially direct, predetermined association between hydraulic working pressure and main fluid flow in such a transmission system.

SUMMARY OF THE INVENTION

According to one aspect of the present invention there is provided a fluid pressure control device, for regulating operation of a hydraulic transmission system which includes first and second hydraulic machines, being respectively a hydropump and a hydromotor connected to be driven by a fluid output from the hydropump, one of which machines is provided with pressure sensitive adjustment means arranged to adjust operation of the machine in dependence upon a control pressure applied to the adjustment means, said device comprising:

a. a hollow valve housing having (i) an inlet passageway, for connection to receive said fluid output from the hydropump, (ii) a main outlet passageway, for connection to deliver said fluid output to the hydromotor, (iii) a control pressure passageway for connection to said adjustment means to apply thereto said control pressure, and (iv) a discharge outlet passageway;

b. a displaceable valve member accommodated in said housing for displacement therein between a first position, affording communication between said inlet passageway and said control pressure passageway whereby said control pressure is deprived from said fluid output, and a second position blocking said communication between said inlet passageway and said control pressure passageway but affording communication between the latter and said discharge outlet passageway;

portions of said valve member defining a predetermined throttling passageway, between said inlet passageway and said main outlet passageway, having dimensions independent of the position of the valve member, whereby flow of said fluid output through said valve housing applies to said valve member a flow-dependent force in a first direction, from said second position towards said first position; and further portions of said valve member defining a control surface facing substantially in said first direction and arranged to be subject to the action of fluid at said control pressure thereby to act against said flow dependent force;

c. variable resilient biasing means arranged to apply to said valve member relative to said valve housing a biasing force in a second direction, opposite to said first direction, said biasing force being variable for an equilibrium position, between said first and second positions, of said valve member in said valve housing.

According to a further aspect of the present invention there is provided a hydraulic transmission system comprising: first and second hydraulic machines, being respectively a hydropump, for providing a fluid output, and a hydromotor connected to be driven by said fluid output; pressure sensitive adjustment means, having a control pressure input, connected with one of said first and second hydraulic machines for adjusting operation thereof in dependence upon a control pressure at said control pressure input; and a fluid pressure control device (having the features noted as (a)–(c) above in this Summary of Invention), for supplying said control pressure thereby to regulate operation of the hydraulic transmission system.

With such a fluid pressure control device arranged for use with its inlet passageway connected to receive said fluid output from the hydropump and its main outlet passageway connected to deliver said fluid output to the hydromotor, and with a small pressure drop at the throttling passageway, a desired relationship can be achieved between the said fluid output and the control pressure to be generated. The device can be designed so that any adverse effect of the control device on the transmission system is small, since the pressure drop across the throttling passageway can be kept very small. By making the biasing force, applied to the said valve member, variable as a function of the pressure of fluid in the valve housing of the transmission system, a predetermined direct association between fluid flow delivered to the hydromotor and working pressure applied to the hydromotor can be achieved, so as to produce a desired power characteristic. It should be noted that the control valve disclosed in the aforesaid German Auslegeschrift No. 2,247,437 does not afford such variability of the biasing force.

An embodiment of the present invention can be made in which the said variable resilient biasing means comprises a spring which bears against a displaceable abutment member the position of which, and therewith the spring bias, is determined by the pressure of fluid in the valve housing. Preferably, the abutment member is a piston subjected to the action of the pressure of fluid in the valve housing and also to the force of a spring assembly which bears against the valve housing. A desired relationship between the fluid flow supplied to the hydromotor, and the working fluid pressure applied thereto may be set by appropriate selection of the characteristic of the said spring assembly.

A fluid pressure control device embodying the present invention can be used in a method of measuring a delivery fluid flow. The control pressure generated at the control pressure outlet passageway of the device is precisely associated with the fluid output from the hydropump received at the inlet passageway of the device, if the biasing force of the variable resilient biasing means applied to the valve member remains unchanged. This will be the case in general, in an embodiment for which variation of the resilient biasing effect depends upon fluid pressure in the valve housing, whereever the pressure of fluid in the valve housing of the device remains below a threshold value which is the minimum pressure able to bring about such variation. Hitherto, it has been found difficult to measure the delivery stream, for example, of hydraulic transmission systems directly "in high pressure." It was necessary to employ indirect methods for example on the basis of the setting or adjustment of the hydropump and/or of the motor of the transmission system.

Other objects, advantages and features of the invention will become readily apparent from the following detailed description of one embodiment which is presented in conjunction with the accompanying drawings.

DESCRIPTION OF THE PREFERRED EMBODIMENTS

Figure 1:
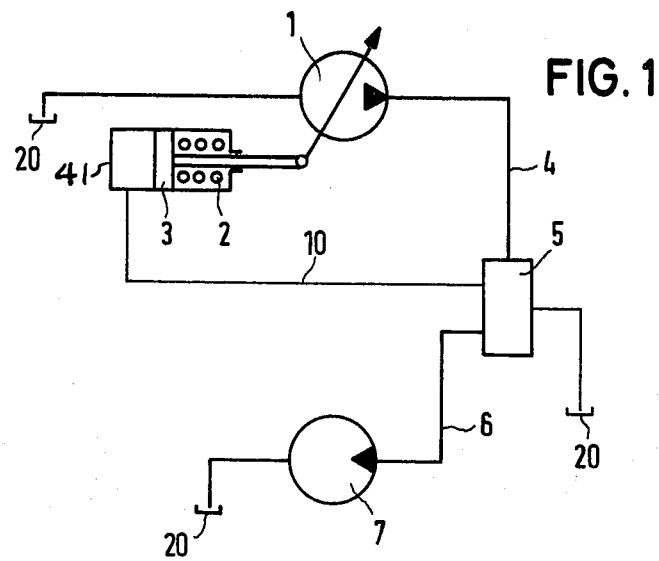
FIG. 1 shows schematically an hydraulic transmission system.

The transmission system shown in FIG. 1 comprises a hydropump 1 and a hydromotor 7 connected via working lines 4 and 6 to be driven by a fluid output from the hydropump. Disposed between the working lines 4 and 6 is a fluid pressure control device 5 which is described in detail hereinafter with reference to FIG. 2. From the control device 5 there branches off a control pressure line 10, constituting a control pressure input, and connected with an adjustment device 41 of the hydropump 1. The adjustment device 41 comprises a correcting (or servo) piston 3, coupled in the hydropump 1, and operating against the force of a spring 2. Operation of the hydropump is adjusted in dependence upon a control pressure acting on the piston 3 against the force of the spring 2, the control pressure being applied, via the control pressure line 10, by way of the control device 5. The hydropump 1, the hydromotor 7 and the control device 5 are connected with a drain or pump sump 20.

Figure 2:
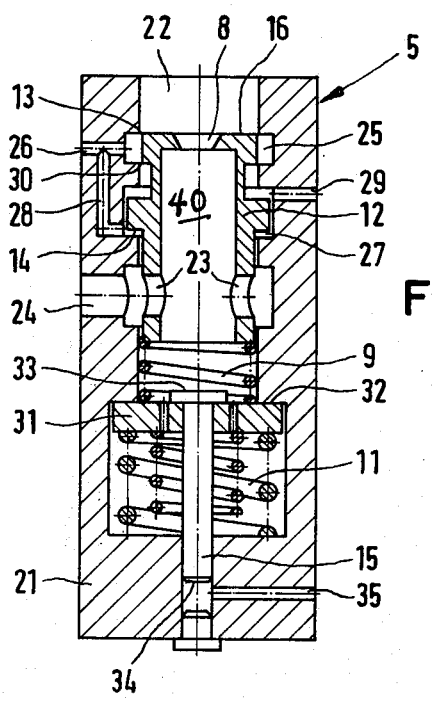
FIG. 2 shows an axial sectional view of a fluid pressure control device embodying the present invention.

The control device 5 shown in FIG. 2 comprises a hollow displaceable valve member 12 accommodated in a hollow valve housing 21, portions of the valve member defining a throttling passageway 8. The fluid output from the hydropump acts on an end face 16 of the valve 4 member 12 and also acts in the throttling passageway 8, the fluid having travelled through the working line 4 and having entered the control device through an inlet passageway 22 thereof at which the working line 4 is connected to the control device 5. On the other hand, the valve member 12 is subjected to a biasing force of biasing spring means constituted by a spring 9, which force opposes the action of said fluid output on the valve member 12 (the biasing force tending to move the valve member upwardly in FIG. 2). The valve member 12 is formed with apertures 23 connecting an interior chamber 40 of the hollow valve member 12 with a main outlet passageway 24 of the control device 5. The working line 6 is connected to the control device 5 at the main outlet passageway 24. The control device 5 has, furthermore, respective control edges 13, shown coincident in FIG. 2 but formed respectively on the valve member 12 and the valve housing 21, and a control chamber 25 in communication with a control pressure outlet passageway 26 of the control device, the line 10 being connected thereto at the control pressure outlet passageway 26. The valve member 12 has a control surface 14. Interior surface portions of the valve housing 21, together with the control surface 14, bound a further control chamber 27 in communication upstream of the control face 14, with the outlet passageway 26 via a duct 28 and in communication, on the other hand, with a discharge outlet passageway 29 which is connected with the drain 20. By upward movement of a control edge 30 of the valve member 12, the outlet passageway 26 can be placed in communication with the discharge outlet passageway 29.

The spring 9 bears on an abutment member 31, auxiliary spring means constituted by a spring assembly 11 mounting said abutment member 31 which is pressed by the force of the spring assembly against a shoulder 32 of the valve housing 21. The abutment member 31 can be moved, against the force of the spring assembly 11, by a piston 15 on a piston face 33 of which acts the pressure of fluid in the valve housing downstream of the throttling passageway 8, which fluid entered the valve housing via the inlet passageway 22. The opposite end 34 of the piston is connected via an outlet passageway 35 with the drain 20.

The mode of operation is as follows:

The hydropump 1 is set at maximum volumetric delivery rate as a result of the spring 2 of its adjusting device 41 acting against the piston 3. The fluid output from the hydropump 1 is channelled, via the working lines 4 and 6 and via the control device 5, to the hydromotor 7 (which may alternatively be some other hydraulic load). In the control device 5, there is generated at the outlet passageway 26 a control pressure acting, via the line 10, on the piston 3 of the adjusting device 41 of the hydropump 1 and, where appropriate, adjusting operation of the hydropump to give a smaller fluid output. The fluid output, passing through the working line 4, and thence through the inlet passageway 22 of the control device 5, generates, from one end to the other of the throttling passageway 8 of the valve member 12, a pressure drop which moves the valve member 12 against the biasing force of the spring 9. As a result, an opening forms between the aforesaid control edges 13 of the member 12 and housing 21, at the end face 16 of the valve member 12, which opening affords communication between the inlet passageway 22 and the outlet passageway 26, thereby to allow inflow of fluid from the hydropump fluid output to the outlet 26, and thence to the line 10. Initially, movement of the valve member 12 is determined substantially only by the pressure drop, generated by way of the throttling passageway 8, and the force of the spring 9, since the valve member 12 is otherwise relieved of load with regard to the pressure of fluid within the valve housing, i.e., is equalized or balanced, since the pressure of the fluid acts both on the upward facing end face 16 and also on the downward facing interior surface portion of the valve member, at the upper end thereof, and on the downward facing lower end surface at which the spring 9 abuts against the member 12.

The control pressure which builds up at the outlet passageway 26 (and also in the line 10) acts, via the duct 28, on the control surface 14 of the valve member 12 and thereby tends to move the valve member back in the direction of the biasing force of the spring 9, i.e. back towards the starting equilibrium position in which the outlet passageway 26 is closed off from the inlet passageway 22. The control pressure in the line 10 builds up until the starting equilibrium position of the valve member 12 is once again reached. If the control pressure present at the outlet passageway 26 (and also in the line 10 and at the control surface 14) exceeds a threshold value so that it causes the valve member 12 to be moved upwardly (with reference to FIG. 2) beyond the starting equilibrium position, which threshold value is determined by the pressure drop at the throttling passageway 8 and the biasing force of the spring 9, then the valve member 12 is moved upwardly, owing to the control pressure acting on the control surface 14, so that communication between the inlet passageway 22 and the outlet passageway 26 is blocked, but a fluid path past the control edge 30 is provided which affords communication between the passageway 26 and the discharge passageway 29. As a result, the control pressure is reduced until the valve member 12 once again reaches its starting equilibrium position.

If the force of the fluid pressure in chamber 40 acting on the piston 15 exceeds the biasing force of the spring assembly 11, the assembly is compressed by downward movement of the abutment member 31, so that the spring 9 becomes less compressed. Also, owing to the downward movement of the abutment member 31, the valve member 12 also moves since the forces acting on the valve member 12 are disturbed out of equilibrium by a decrease in the biasing force of the spring 9 for a given position of the valve member 12. A flow path between the control edges 13 opens and there is set up at the outlet passageway 26 (and in the line 10 as described hereinbefore) a control pressure determined by the new position of equilibrium. If the pressure of the fluid in the valve housing decreases once again to such an extent that the force of fluid pressure acting downwardly on the piston 15 no longer exceeds the biasing force of the spring assembly 11 acting upwardly, then the abutment member 31 is moved upwardly back into its starting position and, therewith, the biasing force of the spring 9 for a given position of the valve member 12 is increased and the control pressure acting on the control surface 14 moves the valve member 12 upwardly so that the control pressure is decreased by discharge of fluid from the inlet passageway 26, past the control edge 30, out through the discharge outlet passageway 29.

By suitably determining the values of the area of the control surface 14, the area of the valve member end face 16, the characteristics of the spring 9, the effective piston diameter of the piston 15, and the characteristics of the spring assembly 11, it is possible to establish any desired one of a variety of possible relationships between the flow of the fluid output from the hydropump 1 and the working pressure of fluid in the transmission system, for example in the line 6. Preferably, this relationship is such that the product of hydropump output and working pressure remains substantially constant, i.e., with increasing working pressure the hydropump is adjusted to deliver a smaller output flow. Thereby, the result can be achieved that the drive capacity, or the drive torque, of the hydropump remains constant for constant rotary drive speed.

An embodiment of the present invention may also be applicable to a hydraulic transmission system having a closed working circuit (in contradistinction to the embodiment having an open circuit shown in FIG. 1). For example, in a reversible transmission system having a closed circuit, respective control devices 5 would be provided in two working lines, which devices would be connected, via lines corresponding to line 10 in FIG. 1, to respective opposite sides of a piston (which would be a double acting piston) of an adjusting device for the hydropump of the system. Adjustment also of the hydromotor 7 of the transmission system may, if so desired, be effected in corresponding manner.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fluid pressure control device, for regulating operation of a hydraulic transmission system which includes first and second hydraulic machines, being respectively a hydropump and a hydromotor connected to be driven by a fluid output from the hydropump, one of which machines is provided with pressure sensitive adjustment means arranged to adjust operation of the machine in dependence upon a control pressure applied to the adjustment means, said device comprising:

a. a hollow valve housing having (i) an inlet passageway, for connection to receive said fluid output from the hydropump, (ii) a main outlet passageway, for connection to deliver said fluid output to the hydromotor, (iii) a control pressure passageway for connection to said adjustment means to apply thereto said control pressure and (iv) a discharge outlet passageway;

b. a displaceable valve member accommodated in said housing for displacement therein between a first position, affording communication between said inlet passageway and said control pressure passageway whereby said control pressure is derived from said fluid output, and a second position blocking said communication between said inlet passageway and said control pressure passageway but affording communication between the latter and said discharge outlet passageway;

portions of said valve member defining a predetermined throttling passageway, between said inlet passageway and said main outlet passageway, having dimensions independent of the position of the valve member, whereby flow of said fluid output through said valve housing applies to said valve member a flow dependent force in a first direction, from said second position towards said first position;

and further portions of said valve member defining a control surface facing substantially in said first direction and arranged to be subject to the action of fluid at said control pressure thereby to act against said flow dependent force;

c. variable resilient biasing means arranged to apply to said valve member relative to said valve housing a biasing force in a second direction, opposite to said first direction, said biasing force being variable for an equilibrium position, between said first and second positions, of said valve member in said valve housing.

2. A device as claimed in claim 1, wherein interior surface portions of said valve housing bound a control chamber space bounded also by said control surface, and wall portions of said valve housing define a branch duct leading from said control pressure passageway to said control chamber space, thereby to subject said control surface to pressure from, fluid in said control pressure passageway.

3. A device according to claim 1, wherein said variable resilient biasing means comprise: abutment means; mounting means, mounting said abutment member for movement in said first and second directions, relative to said valve housing, in dependence upon pressure from said fluid output; and biasing spring means arranged between said abutment means and said valve member, for applying said biasing force to the valve member; whereby such movement of said abutment means can vary said biasing force.

4. A device as claimed in claim 3, wherein said abutment means comprise a movable piston member having a piston face subject to pressure from said fluid output, and wherein said mounting means comprise auxiliary spring means effective between said piston member and said valve housing.

5. A device as claimed in claim 3, comprising stop means for positively limiting movement of said abutment member in said second direction; wherein said abutment means comprise a movable piston member having a piston face subject to pressure, from said fluid output, in said first direction, and wherein said mounting means comprise auxiliary spring means, having first and second opposite ends bearing respectively against said piston member and said valve housing, urging said piston member in the said second direction towards said stop means.

6. A hydraulic transmission system comprising: first and second hydraulic machines, being respectively a hydropump, for providing a third output, and a hydromotor connected to be driven by said fluid output; pressure sensitive adjustment means, having a control pressure input, connected with one of said first and second hydraulic machines for adjusting operation thereof in dependence upon a control pressure at said control pressure input; and a fluid pressure control device, for supplying said pressure thereby to regulate operation of the hydraulic transmission system, said device comprising:

a. a hollow valve housing having (i) an inlet passageway, connected to receive said fluid output from the hydropump, (ii) a main outlet passageway, connected to deliver said fluid output to the hydromotor, (iii) a control pressure passageway connected to said control pressure input to apply thereat said control pressure, and (iv) a discharge outlet passageway;

b. a displaceable valve member accommodated in said housing for displacement therein between a first position, affording communication between said inlet passageway and said control pressure passageway whereby said control pressure is derived from said fluid output, and a second position blocking said communication between said inlet passageway and said control pressure passageway but affording communication between the latter and said discharge outlet passageway; portions of said valve member defining a predetermined throttling passageway, between said inlet passageway and said main outlet passageway, having dimensions independent of the position of the valve member, whereby flow of said fluid output through said valve housing applies to said valve member a flow dependent force in a first direction, from said second position towards said first position;

and further portions of said valve member defining a control surface facing substantially in said first direction and arranged to be subject to the action of fluid at said control pressure thereby to act against said flow dependent force;

c. variable resilient biasing means arranged to apply to said valve member relative to said valve housing a biasing force in a second direction, opposite to said first direction, said biasing force being variable for an equilibrium position, between said first and second positions of said valve member in said valve housing.

7. A system according to claim 6, wherein the said pressure sensitive adjustment means is also connected with the other of the said first and second hydraulic machines, for adjusting operation thereof in dependence upon said control pressure.

8. A system according to claim 6 wherein said pressure sensitive adjustment means comprise a cylinder having interior surface portions bounding a chamber therein in communication with said control pressure input, and a piston coupled to said one of the first and second hydraulic machines and displaceably contained within said cylinder to be movable in dependence upon said control pressure in said chamber.

* * * * *